(12) United States Patent
Pina

(10) Patent No.: US 8,209,717 B2
(45) Date of Patent: Jun. 26, 2012

(54) RECEIVER WITH CONCURRENT MULTI-USER ELECTRONIC PROGRAM GUIDE

(75) Inventor: Jean-Benoit Pina, Paris (FR)

(73) Assignee: Pace Micro Technology PLC (GB)

( * ) Notice: Subject to any disclaimer, the term of this patent is extended or adjusted under 35 U.S.C. 154(b) by 600 days.

(21) Appl. No.: 10/521,130

(22) PCT Filed: Jul. 8, 2003

(86) PCT No.: PCT/IB03/03139
§ 371 (c)(1),
(2), (4) Date: Jan. 12, 2005

(87) PCT Pub. No.: WO2004/008739
PCT Pub. Date: Jan. 22, 2004

(65) Prior Publication Data
US 2005/0251821 A1 Nov. 10, 2005

(30) Foreign Application Priority Data
Jul. 17, 2002 (EP) .................................. 02291801

(51) Int. Cl.
*H04N 7/10* (2006.01)
*H04N 7/025* (2006.01)
(52) U.S. Cl. ............................. 725/39; 725/52; 348/734
(58) Field of Classification Search .................. 725/39, 725/52; 348/734
See application file for complete search history.

(56) References Cited

U.S. PATENT DOCUMENTS

| | | | |
|---|---|---|---|
| 6,130,726 A | 10/2000 | Darbee et al. | 348/734 |
| 6,311,329 B1 * | 10/2001 | Terakado et al. | 725/44 |
| 7,140,033 B1 * | 11/2006 | Durden et al. | 725/80 |
| 2003/0106062 A1 * | 6/2003 | Shteyn et al. | 725/78 |
| 2003/0122966 A1 * | 7/2003 | Markman et al. | 348/563 |
| 2003/0140343 A1 * | 7/2003 | Falvo et al. | 725/51 |
| 2003/0149978 A1 * | 8/2003 | Plotnick | 725/39 |
| 2004/0015989 A1 * | 1/2004 | Kaizu et al. | 725/39 |
| 2004/0237104 A1 * | 11/2004 | Cooper et al. | 725/38 |
| 2005/0055716 A1 * | 3/2005 | Louie et al. | 725/58 |
| 2005/0183115 A1 * | 8/2005 | Maruyama et al. | 725/38 |
| 2005/0278737 A1 * | 12/2005 | Ma et al. | 725/40 |
| 2006/0161865 A1 * | 7/2006 | Scott et al. | 715/810 |

FOREIGN PATENT DOCUMENTS

| | | |
|---|---|---|
| EP | 0952734 A2 | 10/1999 |
| EP | 0952734 A3 | 10/2001 |
| WO | WO0078050 A1 | 12/2000 |
| WO | WO0232138 A1 | 4/2002 |

* cited by examiner

*Primary Examiner* — Pankaj Kumar
*Assistant Examiner* — Charles N Hicks
(74) *Attorney, Agent, or Firm* — McKee, Voorhees & Sease, P.L.C.

(57) ABSTRACT

The invention relates to a receiver comprising electronic program guide means for browsing through an electronic program guide containing information on a plurality of program channels. The electronic program guide means comprise a server module and a number of client modules assigned to a number of remote devices, in order that upon request of any of the remote devices, the server module manages the navigation of the assigned client module within the electronic program guide information.

5 Claims, 1 Drawing Sheet

RECEIVER WITH CONCURRENT MULTI-USER ELECTRONIC PROGRAM GUIDE

FIELD OF THE INVENTION

The invention relates to digital transmissions. More particularly, it relates to a receiver for receiving programs from a transmission system, the receiver comprising electronic program guide means for browsing through an electronic program guide containing information on a plurality of program channels.

It also relates to a remote device comprising input and output means for accessing an electronic program guide containing information on a plurality of program channels transmitted from a transmission system via a receiver and to a home entertainment system comprising such a receiver for receiving programs from the transmission system and a plurality of such remote devices comprising display means for viewing said electronic program guide.

The invention also relates to a multi-user method of remotely browsing through an electronic program guide, to a computer program product for carrying out such a method and to a signal for carrying such computer program.

The invention applies to multimedia transmission systems. It particularly applies to digital television systems such as the DSS (Digital Satellite System) system and the DVB (Digital Video Broadcasting) system and Internet Protocol (IP) networks digital television systems and to home entertainment systems.

BACKGROUND ART

Electronic Program Guides (EPGs) or Interactive Program Guides (IPGs) are applications, which normally run on a screen of a television set or on a set-top box, with the program guide information appearing on the screen of the television. One problem with this approach is that the guide data must either replace or overlay the program that the user is watching, thus interfering with normal program viewing. This is especially a problem when a group of people is watching television and only one of them (usually the one with the remote control) wants to access the program guide.

Various systems and devices for displaying a program guide on a television screen have been proposed. U.S. Pat. No. 6,130,726 A1 is directed to a remote control unit having a graphic display for depicting program scheduling and/or advertising information without causing an interruption in content that is being depicted on an associated television monitor.

Although allowing watching television without being disturbed by the display of a program guide, this system does not allow a plurality of users to access a program guide without disturbing each other.

OBJECT AND SUMMARY OF THE INVENTION

It is an object of the invention to provide a system, which yields a better quality of service by allowing a plurality of users to concurrently view a program guide on distinct display supports.

To this end, the invention proposes:

a receiver for receiving programs from the transmission system, the receiver comprising electronic program guide means for browsing an electronic program guide containing information on a plurality of program channels, a remote device comprising user input and output means for viewing the electronic program guide via such a receiver, and a home entertainment system comprising such a receiver and a plurality of such remote devices, wherein said electronic program guide means comprise a server module and at least a client module assigned to each remote device, in order that upon request of any of the remote devices, the server module manages the navigation of the assigned client module within the electronic program guide information.

The architecture of the EPG is split into two distinct parts: a server module with concurrent multi-users support and one or several client modules dedicated to one or several specific types of remote devices. This advantageously allows several users (potentially distant ones) to concurrently browse an EPG whose data come from the receiver (e.g. set-top box) and to display the result with a remote device.

BRIEF DESCRIPTION OF THE DRAWINGS

The invention and additional features, which may be optionally used to implement the invention to advantage, are apparent from and will be elucidated with reference to the drawings described hereinafter, wherein.

DETAILED DESCRIPTION OF THE DRAWINGS

In digital television (TV), a user browses the list of available programs through dedicated software called an Electronic Program Guide (EPG). The software runs on a receiver, called set-top box (STB). It takes the user's inputs through the remote control and outputs its display on the TV set. Only a single user is able to browse the EPG at the same time. Moreover, when browsing the EPG, the user overloads the On Screen Display (OSD) of the TV set and disturbs the video watching experience of other people, who are in front of the TV set at the same time.

Figure 1:
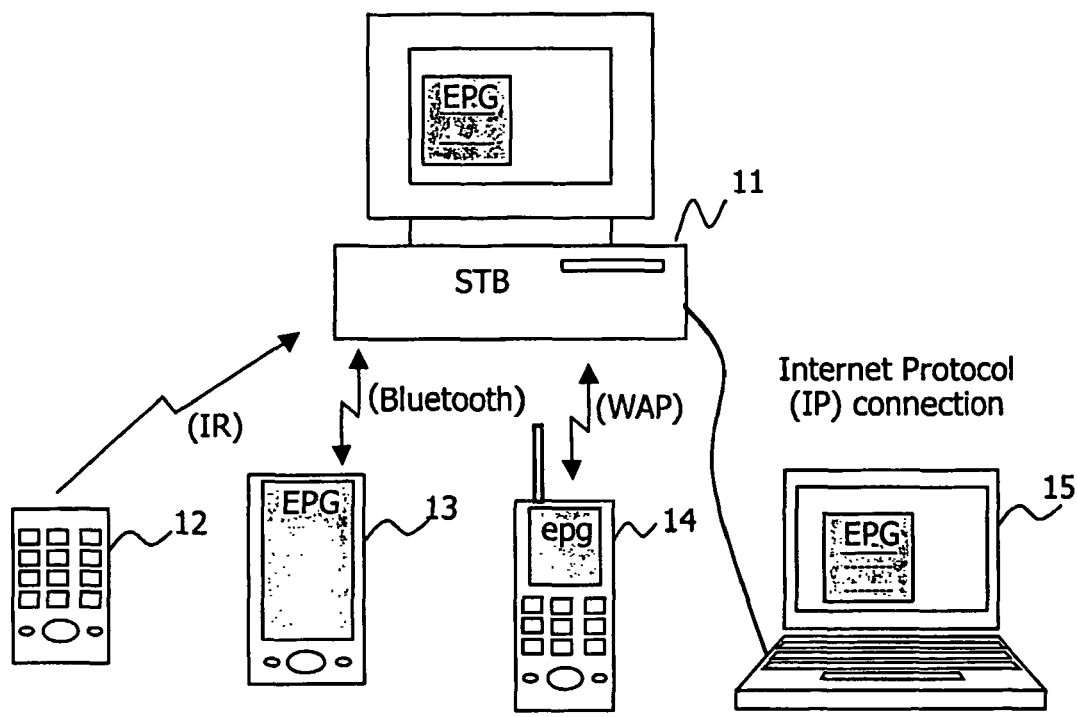
FIG. 1 diagrammatically illustrates an example of a system in accordance with the invention, FIG. 2 diagrammatically illustrates an example of a receiver software stack in accordance with the invention.

FIG. 1 shows an example of a home entertainment system in accordance with the invention, allowing several users (potentially distant ones) to concurrently browse an EPG whose data come from a single receiver.

It comprises a receiver 11, e.g. a STB, for receiving programs from a transmission system, e.g. the digital TV broadcast system, a first remote device, e.g. the infra-red remote control 12 of the STB for to browing the EPG on the TV screen and a plurality of other remote devices capable of establishing by a wire or wireless means a bi-directional transmission to exchange data with the receiver such as, but not limited to, a Personal Digital Assistant (PDA) 13 with Internet Protocol (IP) via a Bluetooth connexion to the receiver or a Wireless Application Protocol (WAP) mobile phone 14 with a Bluetooth, Infra-Red or cellular phone protocol (GSM, GPRS or UMTS, etc.) link to the receiver and a computer 15 with network access to the receiver.

The receiver comprises electronic program guide means for browsing the EPG, which contains information on the TV program channels. All remote devices, except the remote control, should have display means and should be linked to the set-top box with bi-directional communication means (e.g. wire or wireless Bluetooth+Internet Protocol+specific client program) in order that the information of the EPG can be displayed on the remote device. The remote control 12 can still be used as usual for navigating amongst the EPG information on the TV screen. However, at the same time, other users can access the EPG information and display it on their remote devices, without being disturbed by the user of the remote control and without disturbing each other. Upon request of any of the remote devices, including the remote control and all other remote devices having bi-directional links with the receiver, the electronic program guide means manages the navigation of each remote device within the electronic program guide information and displays the selected information either on the TV screen if the request comes from the remote control or sends it to the remote device if the request comes from any other remote device, so that the latter can display it on its own screen.

This invention could also be used in a multi-STB home network, whose typical setup could be a main STB with gateway features receiving EPG information through several media (e.g. common digital televisions signals and/or Internet Protocol (IP) network), connected to another feature-limited STB. The gateway STB, running a server module would gather EPG data and send them in an appropriate format to the feature-limited STB, running a simple client module. Since most of the data processing is done in the main STB, this allows using additional STBs, which can have much less powerful, thus cheaper, capabilities.

Figure 2:
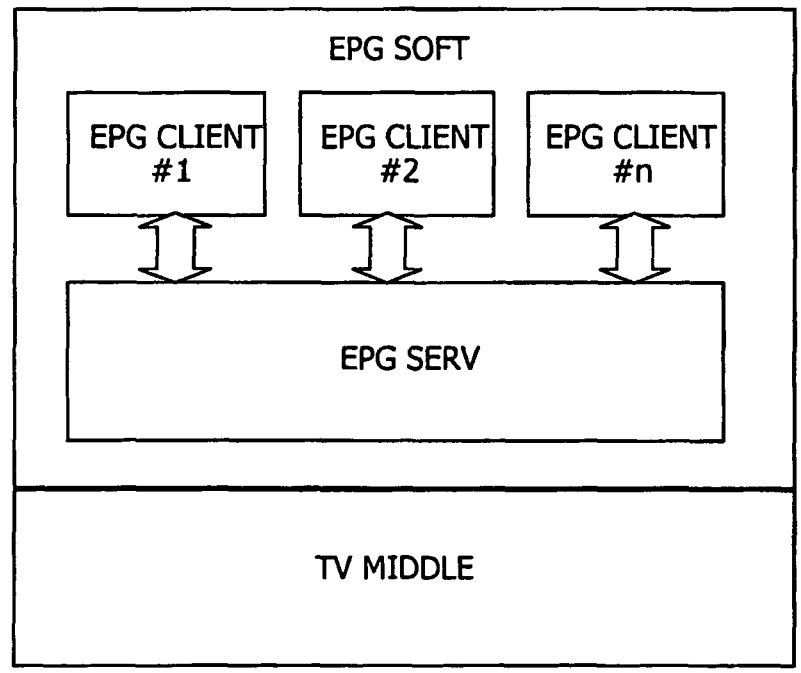

FIG. 2 illustrates the software architecture of the set-top box shown in FIG. 1. It comprises an upper layer including a software stack, denoted EPG SOFT, and a lower layer including a middleware, denoted TV MIDDLE. The software stack EPG SOFT consists of the EPG program. The middleware TV MIDDLE includes all software elements needed to exploit the digital TV and to allow access between the hardware and the signals, on one side, and the software, on the other side. The middleware realizes an interface between the signals received from the channel (cable, satellite, etc.) and/or the peripherals (remote control, PDA, internet platform, etc.) and the EPG software.

The solution to the problem of concurrently browsing the EPG from remote devices lies in the EPG architecture, which comprises two distinct parts:

a server module, denoted EPG SERV, with concurrent multi-users support;

at least a client module, EPG CLIENT #k, k being the index of the client module.

A client module can run either on the STB and/or on the remote device.

The server and the client communicate through a predefined (e.g. proprietary) EPG communication Application Program Interface (API), illustrated with opposite by headed arrows.

A method of remotely browsing, via a receiver, an electronic program guide from remote devices is described below. On the software stack of the STB, the server module requests for the EPG information to the digital TV middleware, which sends it back when found. The EPG server module waits for any client to connect.

When a user wants to browse the EPG from a remote device, a client module is loaded, which initiates a communication with the server module.

The server module then creates a navigation state machine, which is in charge of managing the navigation of the client module within the EPG information.

Each time the user makes an input (like pressing the "Page Down" key, for instance, to navigate down amongst a list of displayed services), the client module sends this command to the server module through the EPG communication API.

The server module then updates the corresponding navigation state machine of the client module and requests for the EPG information to the digital TV middleware, which sends it back when found.

The server module then formats the EPG information so that the remote device can process it and sends the information back to the client module, which then displays it on its dedicated screen or sends it to the appropriate software on the remote device.

Since the server module is able to manage several navigation state machines at the same time, several client modules can be loaded and are active at the same time.

One client module may be a local one, i.e. which runs on the STB, and which is dedicated to the remote control for taking the remote control inputs and displaying the results (the list of services and events) on the TV set (this is the common use of an EPG on a digital receiver). It would be nonsense to load several local client modules if the STB is plugged to only one TV set. The most interesting application of this architecture is to develop special client modules, called "Proxies", whose task is to transform the EPG information content to the appropriate format dedicated to the remote devices. For example, communicating with a mobile phone having WAP facilities requires that the client module is able to format the EPG information transmitted from the STB into WML (Wireless Markup Language) format and to process the WTP requests sent by the mobile phone. The same applies in case the remote device is a computer with a network access, e.g. Internet Protocol (IP) access, except that the client module has to convert the information into widely used, but not restricted to, HTML (HyperText Markup Language), XML (eXtended Markup Language) or any Markup Language format.

The invention has several advantages stated below. The software module EPG SOFT, which extracts the data from the middleware (which is rather complicated) needs to be written only once and can be re-used whatever type of client module is connected. This leads to easier and faster development of EPG software for heterogeneous devices because only the software part required to convert the EPG data to the dedicated device has to be rewritten instead of the whole EPG.

A shared caching mechanism can be advantageously implemented in the server module to manage the EPG information, so that the performance improvement will benefit all connected client modules, i.e.all users.

The invention allows any device to browse the EPG, provided that a corresponding client module, which translates and transports the EPG information, is developed.

The drawings and their description hereinbefore illustrate rather than limit the invention. It will be evident that there are numerous alternatives, which fall within the scope of the appended claims. In this respect, the following closing remarks are made. There are numerous ways of implementing functions by means of items of hardware or software, or both. In this respect, the drawings are very diagrammatic, each representing only one possible embodiment of the invention. Thus, although a drawing shows different functions as different blocks, this by no means excludes that a single item of hardware or software carries out several functions. Nor does it exclude that an assembly of items of hardware or software, or both carries out a function.

Any reference sign in a claim should not be construed as limiting the claim. Use of the verb "to comprise" and its conjugations does not exclude the presence of elements or steps other than those stated in a claim. Use of the article "a" or "an" preceding an element or step does not exclude the presence of a plurality of such elements or steps.

The invention claimed is:

1. In a transmission system, a receiver for receiving programs from the transmission system, the receiver comprising
electronic program guide means for browsing through an electronic program guide containing information on a plurality of program channels, said electronic program guide means comprising:
a server module and at least two client modules, each client module being assigned to a respective remote device of a different type, in order that upon request of one or more of the remote devices, the client module corresponding to the requesting remote device is loaded by the electronic program guide means on the receiver, the client module initiating communication with the server module such that the server module manages the navigation of the assigned client module within the electronic program guide information, and
wherein the client modules cause the transformation of the electronic program guide information into a plurality of different dedicated formats for display on a corresponding plurality of different remote devices to allow the electronic program guide on the receiver to be navigated by the remote devices.

2. A remote device comprising input and output means for accessing an electronic program guide containing information on a plurality of program channels transmitted from a transmission system via a receiver, the receiver having electronic program guide means for browsing through said electronic program guide, said electronic program guide means comprising:
a server module and at least two client modules, one client module being assigned to said remote device and one client module being assigned to another remote device of a different type, in order that upon request of one or more of the remote devices, the client module corresponding to the requesting remote device is loaded by the electronic program guide means on the receiver, the client module initiating communication with the server module such that the server module manages the navigation of the assigned client module within the electronic program guide information, and
wherein the client modules cause the transformation of the electronic program guide information into a plurality of different dedicated formats for display on a corresponding plurality of different remote devices to allow the electronic program guide on the receiver to be navigated by each remote device.

3. A remote device as claimed in claim 2, wherein said output means include display means for viewing the electronic program guide on said display means.

4. A home entertainment system comprising a receiver for receiving programs from a transmission system, the receiver comprising:
electronic program guide means for browsing through an electronic program guide containing information on a plurality of program channels, and a plurality of remote devices of different types comprising input and output means for accessing said electronic program guide, said electronic program guide means comprising
a server module and a plurality of client modules, each client module being assigned to a different type of remote device, in order that upon request of one or more of any remote devices, the client module corresponding to the requesting remote device is loaded by the electronic program guide means on the receiver, the client module initiating communication with the server module such that the server module manages the navigation of the assigned client module within the electronic program guide information, and
wherein the client modules cause the transformation of the electronic program guide information into a plurality of different dedicated formats for display on a corresponding plurality of different remote devices to allow the electronic program guide on the receiver to be navigated by the remote devices.

5. A program storage device readable by a receiver component of a transmission system, the program storage device tangibly embodying a computer readable memory and a program of instructions executable by the receiver to allow for remotely browsing through an electronic program guide containing information on a plurality of program channels transmitted from the transmission system via the receiver, the receiver connected to at least two remote devices of different types, said storage device being adapted to accomplish said remote browsing by:
providing a server module for interacting with at least two client modules, each client module being assigned to a respective remote device of a different type; and
managing the navigation of the assigned client module within the electronic program guide information upon request of one or more of the remote devices, the client module corresponding to the requesting remote device is loaded into the computer readable memory on the receiver, the client module initiating communication with the server module; and
wherein the client modules cause the transformation of the electronic program guide information into a plurality of different dedicated formats for display on a corresponding plurality of different remote devices such that the electronic program guide on the receiver is navigable by the remote devices.

* * * * *